(12) United States Patent
Solan et al.

(10) Patent No.: US 11,711,204 B2
(45) Date of Patent: Jul. 25, 2023

(54) USING SPARSE MERKLE TREES FOR SMART SYNCHRONIZATION OF S3

(71) Applicant: EMC IP Holding Company LLC, Hopkinton, MA (US)

(72) Inventors: Alex Solan, Hertzelia (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 590 days.

(21) Appl. No.: 16/776,129

(22) Filed: Jan. 29, 2020

(65) Prior Publication Data

US 2021/0234671 A1    Jul. 29, 2021

(51) Int. Cl.
| | |
|---|---|
| *G06F 16/00* | (2019.01) |
| *H04L 9/06* | (2006.01) |
| *G06F 16/22* | (2019.01) |

(52) U.S. Cl.
CPC ........ *H04L 9/0643* (2013.01); *G06F 16/2246* (2019.01); *G06F 16/2255* (2019.01)

(58) Field of Classification Search
None
See application file for complete search history.

(56) References Cited

U.S. PATENT DOCUMENTS

| | | | |
|---|---|---|---|
| 10,587,516 B1 * | 3/2020 | Arad | G06F 16/2455 |
| 10,608,824 B1 * | 3/2020 | Praus | H04L 9/083 |
| 2010/0094907 A1 * | 4/2010 | Cohen | G06F 16/10 |
| | | | 707/E17.009 |
| 2018/0006820 A1 * | 1/2018 | Arasu | G06F 16/00 |
| 2019/0042571 A1 * | 2/2019 | Li | G06F 3/061 |
| 2019/0197562 A1 * | 6/2019 | Woerner | H04L 9/3228 |
| 2020/0073962 A1 * | 3/2020 | Natarajan | H04L 9/0643 |
| 2020/0169402 A1 * | 5/2020 | Zhuo | G06F 16/2246 |
| 2020/0379977 A1 * | 12/2020 | Saket | H04L 9/3239 |
| 2020/0382283 A1 * | 12/2020 | Irazabal | G06F 7/556 |
| 2020/0394648 A1 * | 12/2020 | Blackshear | G06Q 20/3823 |
| 2021/0021426 A1 * | 1/2021 | Scherrer | H04L 63/123 |
| 2021/0103564 A1 * | 4/2021 | Fretz | G06F 16/9014 |
| 2021/0232568 A1 * | 7/2021 | Yoon | G06F 16/27 |
| 2021/0234683 A1 * | 7/2021 | He | H04L 9/3239 |

FOREIGN PATENT DOCUMENTS

| | | | | |
|---|---|---|---|---|
| CN | 109165224 A | * | 1/2019 | G06F 21/6227 |
| GB | 2593421 A | * | 9/2021 | G06F 21/64 |

* cited by examiner

*Primary Examiner* — Hasanul Mobin
(74) *Attorney, Agent, or Firm* — Workman Nydegger

(57) ABSTRACT

One example method, which may be performed in connection with an object store, includes receiving a key of a key-value pair, correlating the key to a location in a base of a Merkle tree, inserting the key at the location, hashing the value associated with the key to produce a data hash, and inserting the data hash in the Merkle tree. The Merkle tree may then be checked for consistency, and synchronized with another Merkle tree. The Merkle tree may be of a fixed size, and insertion of the key in the Merkle tree does not change the location of any keys existing in the Merkle tree prior to insertion of the new key.

18 Claims, 8 Drawing Sheets

USING SPARSE MERKLE TREES FOR SMART SYNCHRONIZATION OF S3

FIELD OF THE INVENTION

Embodiments of the present invention generally relate to data synchronization. More particularly, at least some embodiments of the invention relate to systems, hardware, software, computer-readable media, and methods for data synchronization in data protection environments that store unordered data such as objects.

BACKGROUND

In data replication and backup systems, there is a need to ensure that the data at the target site, that is, where the replica or backup is stored, is synchronized with the data that is being backed up, that is, the source data. For example, when Input/Output (IO) operations, such as write, modify and delete, are issued with respect to the source data, such IOs may cause changes to the source data. Thus, the backup must then be updated to reflect the changes to the source data, that is, the backup data must be synchronized with the source data.

Synchronization may be particularly difficult to establish and maintain in dynamic environments where there is an ongoing stream of changes to the source dataset that must be reflected in the target dataset. While approaches have been devised to deal with data synchronization in data protection environments based on block storage, such approaches may be of limited applicability. For example, block storage solutions are not well suited, if at all, for use in Key Value Pair (KVP) data protection environments that employ object storage. Thus, it would be useful to provide a synchronization approach for object storage environments that may be dynamic in terms of the changes that are made to the source dataset and target dataset.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
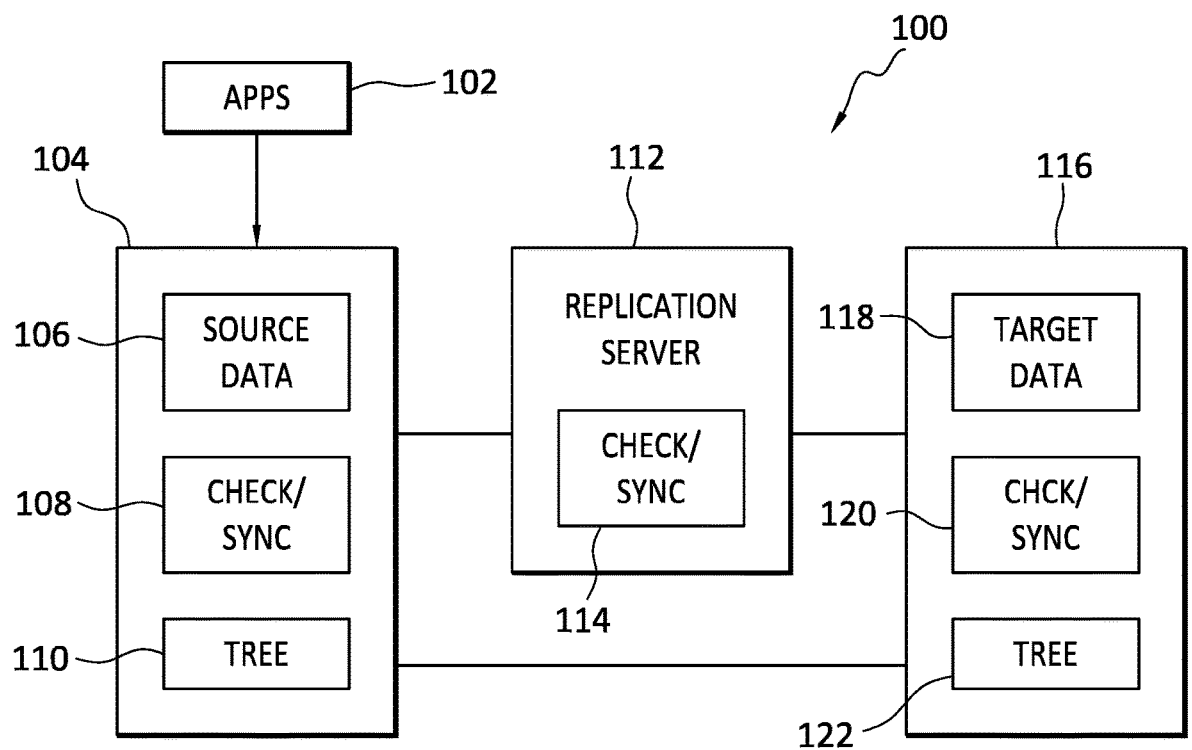
FIG. 1 discloses aspects of an example operating environment.

Embodiments of the present invention generally relate to data synchronization. More particularly, at least some embodiments of the invention relate to systems, hardware, software, computer-readable media, and methods for data synchronization in Key Value Pair (KVP) data protection environments.

In general, example embodiments of the invention may be concerned with, among other things, performance of consistency checks and synchronization as between a source dataset and a target dataset, in an object storage environment. To this end, example embodiments may employ respective Merkle trees for each of the source dataset and the target dataset. Use of the Merkle trees may enable comparisons to be made between the source dataset and target dataset, that is, consistency checks, and, based on the outcome of the consistency check, may also enable implementation of actions to synchronize the source dataset and target dataset with each other. In some embodiments, the Merkle trees are a binary trees, while in other embodiments, the Merkle trees are non-binary trees. The scope of the invention is not limited to any particular type of tree.

In at least some embodiments, the Merkle trees may be considered as 'sparse,' insofar as they may each include any number of nodes whose hash is 0, and the Merkle trees may be constructed such that they have a constant base size. Note that the use of a sparse Merkle tree is not required however, and may be omitted from some embodiments. A mapping mechanism may be provided that maps user Key Value Pairs (KVPs) to respective leaves of the Merkle tree. Using a hash function in concert with the Merkle trees, the Merkle trees may be updated, such as to reflect a write operation for example, in a way that does not result in an unbalanced Merkle tree.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that those embodiments may enable the performance of consistency checks and synchronization in object storage data protection environments, one example of which is KVP storage such as Amazon S3. An embodiment of the invention may employ a mapping scheme and a hash scheme to efficiently update respective source dataset and target dataset Merkle trees to reflect IOs. An embodiment of the invention may optimize, that is, minimize, the extent to which a Merkle tree may need to be recalculated as a result of an IO, such that object storage datasets may be synchronized relatively quickly even in dynamic environments in which IOs are directed to a source dataset on an ongoing basis. An embodiment of the invention may enable the addition of a new element to a Merkle tree without changing the structure of the Merkle tree.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data write operations, data delete operations, Merkle tree update operations, consistency check operations, and synchronization operations. Further example operations performed by and/or at the direction of one or more embodiments may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS S3, Google Cloud, and Dell EMC Cloud Storage Services. More generally however, the scope of the invention is not limited to employment of any particular type or implementation of cloud storage. At least some embodiments may be particularly well suited for use in object storage environments, such as the Amazon S3 storage environment, which implements a KVP approach to object storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may include various applications 102, which may be hosted at one or more clients for example, that issue IOs, such as IOs to read, write, modify, and delete, data. The applications 102 may be any type of application including, but not limited to, applications such as word processors, spreadsheets, email applications, and database applications.

The IOs issued by the applications 102 may be directed to a client 104, which may, or may not, also host the applications 102. The client 104 may include a source dataset 106 to which the application 102 IOs are directed. The source dataset 106 may be located other than at the client 104. The client 104 may further include a Check/Synch (C/S) module 108. Among other things, the C/S module 108 may operate to create and/or update a tree 110 to reflect changes to the source dataset 106 resulting from the application 102 IOs. In general, the tree 110 may contain representations of the data stored in the source dataset 106. The tree 110 may be updated in real time as the source dataset 106 is modified as a result of the IOs issued by the applications 102. In some embodiments, the tree 110 may take the form of a Merkle tree, or a sparse Merkle tree, but any other configuration or structure of comparable functionality may alternatively be employed.

The example operating environment 100 may further include a replication server 112 that may communicate with the client 104. In general, the replication server 112 may serve to replicate the source dataset 106 to one or more targets. In some embodiments, the replication of the source dataset 106 may be implemented as an ongoing, continuous, process. Additionally, or alternatively, the source dataset 106 may be replicated, such as by the replication server 112 for example, at one or more discrete points in time. In some embodiments, the replication server 112 may include a C/S module 114. In terms of its functionality, the C/S module 114 may be the same as the C/S module 108, with the information being communicated by the client 104 to the C/S module 114. In some embodiments, one or the other of the C/S modules 108 and 114 may be omitted.

With continued reference to FIG. 1, a data storage site 116 may also be provided in the example operating environment 100. The data storage site 116 need not have any particular configuration or location but may, in some embodiments, take the form of, or comprise, an on-premises cloud storage site or an off-premises cloud storage site. The data storage site 116 may communicate indirectly with the client 104 by way of the replication server 112 and/or directly with the client 104. In the latter case, the replication server 112 may be omitted, and the replication functionality performed at the data storage site 116, for example.

The data storage site 116 may comprise, or consist of, object storage. At least some example object storage environments employ a KVP approach to object storage. However, any other approach functionally equivalent to the KVP format may be employed in object storage employed in embodiments of the invention.

Among other things, the data storage site 116 may include a target dataset 118 to which the source dataset 106 is replicated. As disclosed elsewhere herein, the target dataset 118 may be updated, continuously in some embodiments, to reflect changes made to the source dataset 106 as a result of IOs issued by the applications 102. This updating of the target dataset 118 may be performed by any implementation of the C/S modules 108, 114, and 120.

The data storage site 116 may also include a tree 122 that is similar, or identical, in structure and function to the tree 110. In general, the tree 122 may be updated, such as by one of the C/S modules 114 or 120 for example, to reflect changes made to the target dataset 118. Each of the trees 110 and 122 may be stored together with the dataset to which it respectively corresponds, namely, the source dataset 106 and the target dataset 118. However, the trees 110 and 122 need not reside, or be hosted, at any particular location or by any particular entity. In one example embodiment, one or both of the trees 110 and 122 may reside at the replication server 112.

With continued reference to FIG. 1, and as explained in further detail elsewhere herein, any of the C/S modules 108, 114, and 120, may perform, and/or cause the performance of, a consistency check, and/or synchronization, as between the source dataset 106 and the target dataset 118. The consistency checks may be performed on an ongoing basis as IOs are directed to the source dataset 106, and/or may be performed at one or more discrete points in time. Put another way, a C/S module may perform a consistency check by comparing, for example a tree associated with a first dataset and a tree associated with a second dataset. If the trees do not match in structure and content, then it may be concluded that the first and second datasets are in an inconsistent state with respect to each other. Once inconsistencies are identified, the first dataset and/or second dataset, and their respective tree(s) may be updated accordingly. The updating of the datasets and trees may be performed by the C/S module.

B. Aspects of a Comparative Example and Expected Problems

Figure 2:
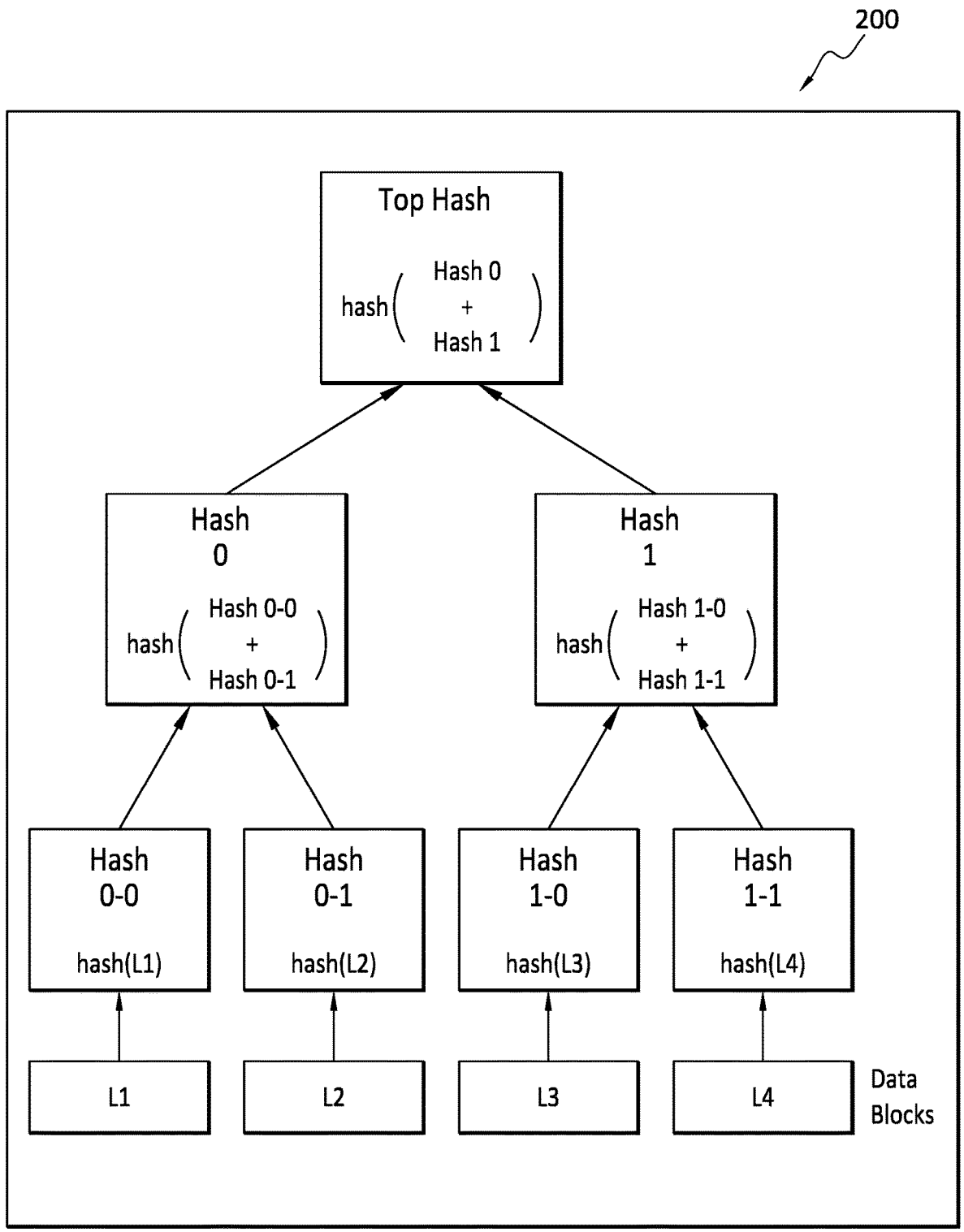
FIG. 2 discloses aspects of an example tree for a group of data blocks.
Figure 3:
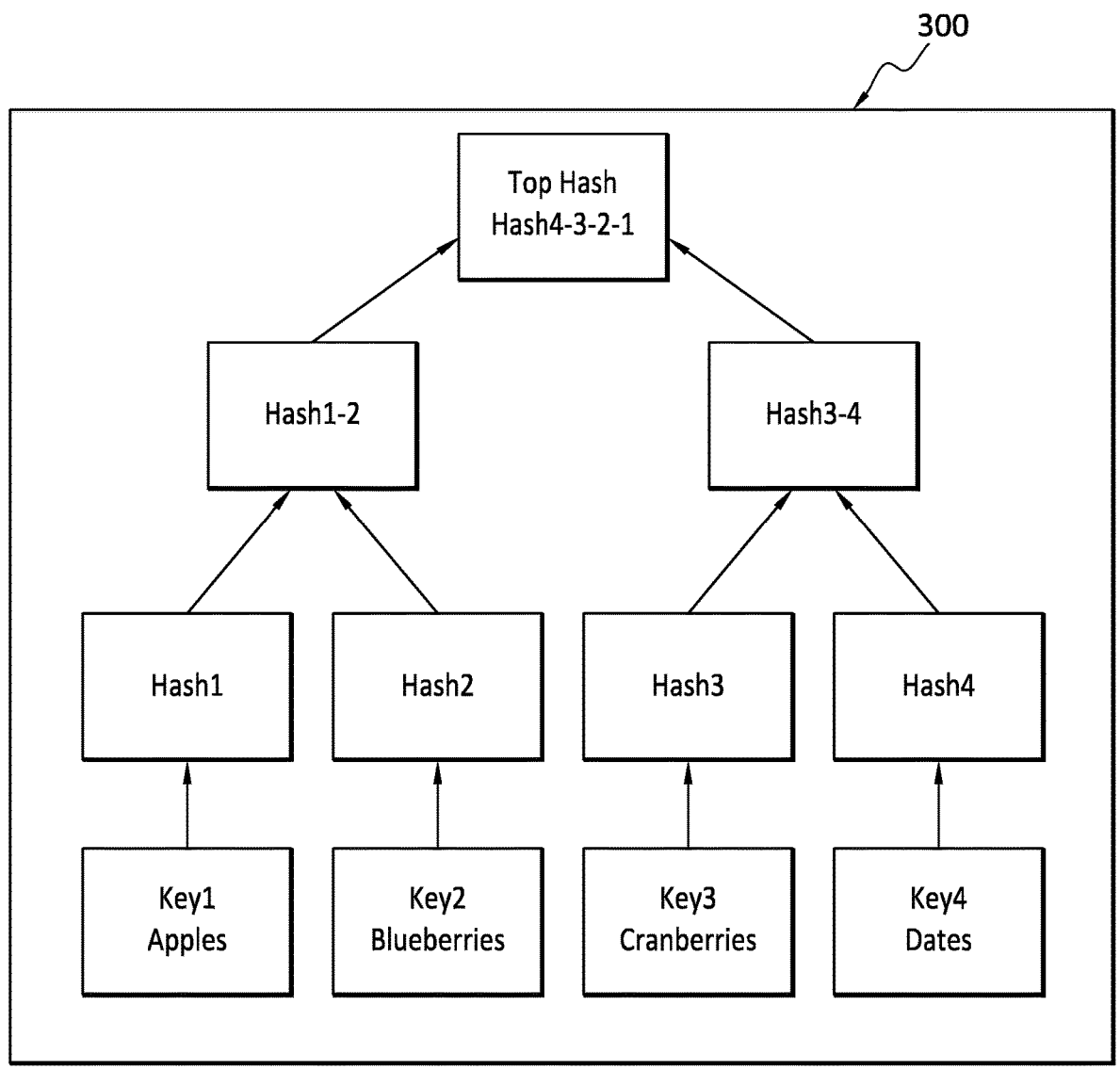
FIG. 3 discloses aspects of another example tree for a group of data blocks.
Figure 4:
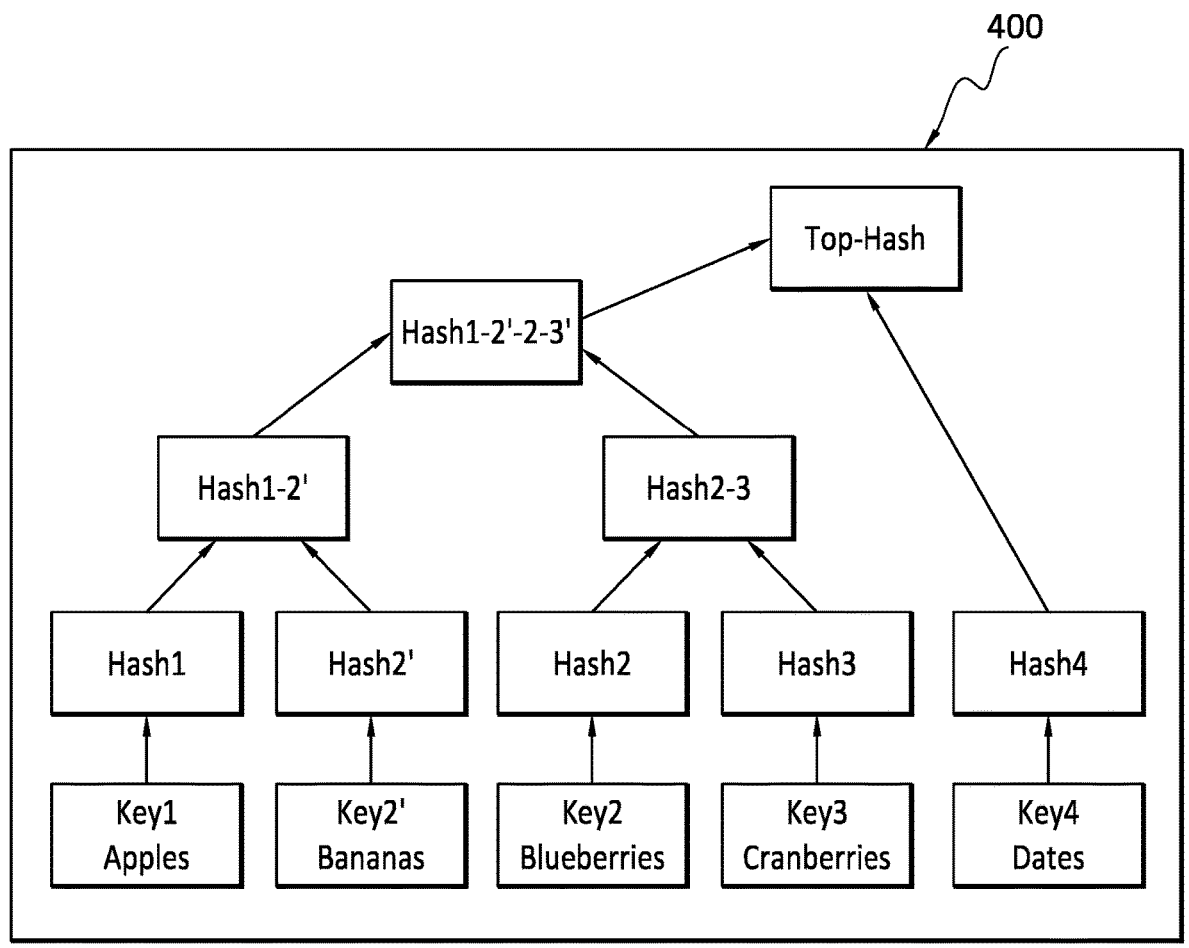
FIG. 4 discloses aspects of an unbalanced tree for a group of keys in which a new key has been inserted into an ordered tree base.

In order to better illustrate aspects of embodiments of the invention, attention is directed next to FIGS. 2-4 and a discussion of how Merkle trees might be employed in a block storage environment. As noted herein, at least some embodiments of the invention are well suited for use in object storage environments.

With particular reference to FIG. 2, it can be seen that the disclosed Merkle tress is a tree of hashes. For a given block, the data itself can be kept, along with a corresponding tree of hashes, each hash constituting a hash of a respective block of data. The leaves are the hashes of each block of the device. To illustrate with a simple example, the parent of each two nodes is the hash of the hashes of those two nodes. Thus, in the example of FIG. 2, Hash 0 is a hash of the combination of Hash 0-0 and Hash 0-1.

If the data of one of the hashed blocks changes, such as L2 in FIG. 2, then hash (L2) would have to be calculated, and then all the hashes up the tree to the root also need to be recalculated. That is, Hash 0, and the Top Hash, would have to be recalculated. The dependent nature of the tree structure may have significant implications where large trees are involved. To illustrate, for a disk with n blocks, O(log(n)) hashes would need to be updated for every change in a data block. As an example, suppose a 1 TB disk has 2 billion blocks with a binary tree depth of 31. An update operation to a data block of that disk would requires 31 hash operations to update the tree.

Following is a brief discussion of how data synchronization using Merkle trees may be performed in a block storage environment. Assume there are two disks in distant locations that we wish to synchronize so that they have the same data.

One, basic, approach to synchronization might be:
1. Read disk1
2. Read disk2
3. Send all disk1 data to location 2
4. Compare This approach would thus require, for a full data comparison, that all the data at one location be sent to the other location. Such an approach would be wasteful of time and system resources.

A somewhat more sophisticated approach to synchronization might be:
1. Read disk1 and hash the data blocks
2. Read disk2 and hash the data blocks
3. Send disk 1 data hashes to location 2
4. Compare hashes and request the data only for the blocks that have different hashes In this approach, all the hashes were sent, and only the data on areas that differ was sent. Since hashes are much smaller than the data they correspond to, this approach represents a significant improvement over the approach just discussed above. Of course, if disk1 and disk2 are completely different, then all the data would have to be sent, as in the earlier example. But if only some areas of disk1 and disk2, are different this approach is a substantial improvement.

The immediately preceding approach to synchronization might be improved with the use of Merkle trees, as follows:
1. Read disk1 and create a Merkle tree Tree1
2. Read disk2 and create a Merkle tree Tree2
3. Traverse the trees using this function (pseudo code, run Tree2):
    Function MerkleSync(node) {
        Hash1=Get_hash_of_same_node_in_tree1
        If Hash1==node.hash
            Return; //Hashes match. Subtree matches. Done.
        //if we got to here there is a difference in the subtree
        If node.isLeaf
            Get_data_of_same_node_in_tree1
        else
            //recursively scan the children
            foreach child of node
                MerkleSync(child)
To trigger this on Tree2 call MerkleSync(root2)
In this example, Tree1 and Tree2 are identical to each other in structure as the size of the disks must match. The improvement lies in the fact that only a subset of hashes need to be transferred. If only a specific area of the disk had changes, only hashes and blocks of that area in the subtree are transferred. Thus, the complexity of building the tree is rewarded by significant reduction in data transfer.

While advantageous in some respects, synchronization approaches such as those just outlined above may be problematic in other respects. Some problems with these approaches are discussed below in connection with FIGS. 3 and 4.

For example, Merkle trees synchronization requires that the topology of the two trees compared be identical. The algorithm traverses the two trees in parallel looking for changes in the hashes. This requires that the trees have a fixed topology or that changes will be coordinated. However, changing the tree topology is costly and reduces the performance of the algorithm unless the trees are rebalanced, incurring yet more resource cost to implement. See FIGS. 3 and 4, discussed below, for an example.

As another example, rebalancing of the tree as a result of an IO may require recalculation of hashes in large areas of the Merkle tree. Each node in a Merkle trees contains, or implies, a calculation based on the hashes of the children of the node. Rebalancing a tree will change the children of a node, and therefore large areas of the tree will require recalculation. As a result, an O(log(n)) update time is no longer achievable.

Yet another concern is that efficient maintenance of a Merkle tree requires that changes in the tree stay local to the subtree where the change happened. Particularly, in order for update times to stay at O(log(n)), only a specific subtree must be affected. It is relatively simple to use a Merkle Tree for blocks on a disk, since as leaves are mapped to a fixed disk address, a change in the value of the block changes its hash and the subsequent parent nodes, but does not change the hashes of the blocks that are not related to the resulting sub tree. For instance, a block in the first half of the disk that changes, will not change anything in the second half of the tree. It changes only itself and all the path from itself to the root.

In a further example of a problem that could arise with synchronization approaches such as those outlined above, the naïve way of having objects placed as leaves of the tree will result in changes in tree topology. Thus, application of Merkle trees in an object, rather than block, storage environment would present significant challenges. For example, it is not clear how mapping to the leaves could be performed.

One way to approach this might be to order the leaves by a lexicographic value of the key and insert to the tree according to the key. However, such an approach would likely not work well. Objects are added and removed from the object storage all the time. As a result, keys are added and removed in a sorted list, which shifts the locations of other keys. Mapping to leaf nodes of the tree will change and, as a result, change the topology of the Merkle tree. Such an approach would cause a re-structure of the entire tree and recalculation of many hash values, as described above. More generally, any sorting criteria would suffer from the same issues.

Alternatively, a linearly incrementing order, such as a timestamp of the object, might be employed, but that approach is problematic also. While only keys would be appended to the leaf list, significant tree rebalancing would still be required to be at O(log(n)). The example discussed below further illustrates some of the concerns noted above.

With particular reference to the example of FIG. 3, the sorted keys of the tree 300 are shown as: Apples, Blueberries, Cranberries, Dates—and a new key is inserted: Bananas. Thus, the new sort order (alphabetic, for the purpose of illustration) would be: Apples, Bananas, Blueberries, Cranberries, Dates. As shown in FIG. 4, the shift in leaf order, that is, the insertion of the Bananas key between the respective keys of Apples and Blueberries, will create an unbalanced tree 400. FIGS. 3 and 4 thus collectively illustrate a problem, or problems, with attempting to use, in an object storage environment that employs KVPs, synchronization processes better suited for block storage environments.

For example, FIG. 3 shows an unmodified binary tree 300 of key values, while FIG. 4 illustrates the new configuration of the binary tree 400 after the 'Bananas' key has been added. A number of points are apparent from the comparison of FIGS. 3 and 4. One is that the insertion of the 'Bananas' Key2 has changed the structure of the tree 300 by causing a shift in the positions of Keys 2, 3 and 4. As well, the tree 400 now includes an unbalanced portion, namely, Key 4 is no longer associated with a root hash. Compare the unmodified tree 300 of FIG. 3, where Key 4 is associated with the root Hash3-4.

Further, it will be apparent from FIG. 4 that that insertion of the 'Bananas' Key2 will necessitate recalculation of several different hashes in the tree 400. For example, while Hash1 will remain unchanged, since the 'Apples' Key1 precedes, in alphabetical order, the new 'Bananas' Key2, but instead of being hashed together with the hash of 'Blueberries' Key2 (FIG. 3), the 'Apples' Key1 will now be hashed together with the hash of 'Bananas' Key2. This same result is repeated down the entire group of keys. Further, a new hash Hash2-3 is newly created for the tree 400, but that Hash2-3 was not present in the tree 300.

Thus, even in the simple example of FIGS. 3 and 4, which involves a total of only five keys, a significant number of hash recalculations would be necessitated by the insertion of the 'Bananas' Key2. Clearly, where a tree in a real life application may include, for example, a million or more nodes, the number of calculations that would be necessitated by insertion of even one new key is wholly unworkable and impractical. Of course, the problem is magnified still further when a million node tree must be continuously updated with new keys to reflect an ongoing stream of 10s.

The example of FIGS. 3 and 4 thus clearly illustrates that the use of an ordered approach to key insertion in a Merkle tree is not workable. This is true at least because significant, and ongoing, rebalancing of the Merkle tree would be required due to the changes in the tree structure necessitated by insertion of new keys in a specified order and location.

B. Aspects of Some Example Embodiments

With the discussion of the example of FIGS. 3 and 4, attention is directed now to a discussion of aspects of some example embodiments of the invention. In general, embodiments of the invention may be implemented in any storage environment that involves the storage of an unordered set of items where the stored data or other stored items have no particular order, arrangement, or location. One example of such an environment is an object storage environment, and a particular example of an object storage environment is a storage environment that involves the use of KVPs. Amazon S3 is an example storage environment that employs KVPs. As used herein, a 'key' refers to a name assigned to a particular object, and the 'value' refers to the content of the object. 'Metadata' embraces a set of name/key-value pairs with which information regarding the object can be stored.

Example embodiments of the invention may employ one or more trees, such as Merkle trees, whose topology is not affected by IOs written to a dataset to which the tree corresponds. That is, updates to a tree necessitated by an IO written to a dataset that corresponds to the tree do not cause a change to the topology of the tree that is being updated and, as such, an updated tree may not need to be rebalanced.

Moreover, at least some embodiments of the invention are agnostic as to the location of any particular data, that is, knowledge of the location of the data itself may not be needed for the implementation and operation of some embodiments. Instead, such embodiments may operate effectively based on knowledge of the location of a hash of the data, or key. More particularly, embodiments of the invention may provide stability in the sense that addition of a key to a dataset, and the corresponding addition of the hash of the key to a tree, may not necessitate any changes to the respective locations of hashes already in the tree. As the foregoing suggests, embodiments of the invention may provide for the storing of hashes, rather than keys, in a tree structure such as a Merkle tree.

It is noted that the scope of the invention is not limited to the use of hashes such as the Sha1 hash function. Rather, and more generally, any other deterministic function may be used instead of a hash function. Hash functions and other deterministic functions may be advantageous. For example, and as discussed in more detail below, due to their deterministic nature, the hashing of a particular key for example will always produce the same hash value, or hash.

Embodiments of the invention may provide mechanisms for storing and mapping hashes in a way that correlates a storage location for a hash with the value of that hash. In some particular embodiments, the storage location for the hash is determined based on the value of the hash. Because the storage location in the tree may be related to the hash value, the addition of a new hash value to a tree may have no effect on any other hash values already in the tree and, thus, the topology of the tree is not changed by addition of the new hash value. As well, embodiments of the invention may, in some circumstances, eliminate, or substantially eliminate, any likelihood of hash collisions, that is, a situation in which two different hash values correlate to the same location in the tree. The extent to which a hash collision is likely or not may be a function of the number of nodes in the tree, and the number of hash values stored, or to be stored, in that tree.

B.1 Mapping Functions

As used herein, a 'mapping function' is one which correlates, in some way, a storage location for a hash with the value of that hash. When protecting an object store, such as Amazon S3, for example, an administrator may not be able to control the keys the user can add, remove, or modify. Thus, in order to employ Merkle trees, which may, or may not, be binary trees, for mapping the objects in storage, a mechanism is provided to enable consistent mapping between the keys and the leaves of the Merkle tree. As noted, embodiments of the invention may provide a functionality in which a storage location for a hash is correlated with the value of that hash, such as by determining the location based upon the hash value.

In at least some embodiments, the mapping approach may have any one or more of the following characteristics: Determinism—applying the mapping to the same key will calculate the same result; Stability—adding new keys will not modify the mapping results of existing keys or, at least, will not modify the mapping results of a significant number of keys, and as such, the structure of the tree is stable; Stability on Remove—removing a key will not modify the mapping results of any retained keys that still exist; Steadiness—any of the aforementioned operations should not cause the tree topology to change; and, Efficiency—performance of the mapping should be computationally lightweight to calculate ($O(\log(n))$). Put another way, the tree should have a stable base.

It will be appreciated that a variety of functions may be employed to correlate, or map, a hash storage location in a tree with the value of that hash. Thus, the functions disclosed herein are provided only by way of example, and are not intended to limit the scope of the invention in any way.

In some particular embodiments, the mapping function uses Hash(key), which may be modified as described below. Hashes are stable functions that are not affected by other keys and therefore should meet the criteria listed above. If a key is mapped to a leaf index of the tree using the hash of the key, it may be assured that it will always get to the same index, and therefore the same leaf node, regardless of the existence and status of other keys. Thus, a particular hash value may always map to the same location in the tree.

In some embodiments, there may be a need to limit the size of the base of the tree and, accordingly, there may be a need to limit the value to be obtained from the mapping function. For example, if a hash size of 64 bits were employed, such a hash size may result in a tree with a base too large to be practical. Thus, there may be a need to use a hash function with a small enough target range. In one example embodiment, the hash function may be limited to some maximum number M for the size of the tree base by using modulo, such that the mapping function is as follows (an example approach for selecting the value of 'M' is discussed below): Map(key)=Hash(key)% M, where 'Map (key)' is the location in the tree of the hash value 'Hash (key).' This mapping function may be generalized as: [hash value] modulo [tree size].

As this example mapping function indicates then, the mapping function, in general, is a function that determines a location for a hash value of a key based on the particular hash value. Thus, each location in the tree may be unique to a particular key and hash value of that key. Consequently, the tree structure may not be affected by the addition of one or more additional hash values, since each of those hash values may correspond to a different respective key. Following are some further points concerning the example discussed above.

The tree may have a constant base size M. Further, the hash function, or any other deterministic function, may be applied to the keys, rather than to the object to which the key refers. As well, the hash functions may need a large enough range in order ensure that there will be no hash collisions, or an acceptable number of hash collisions. For example, in some embodiments, the range of hash function values may be about 2 or 3 times the number of keys that are hashed or expected to be hashed. Finally, and as noted earlier, it is not required that the function 'Hash(key)% M' be used to determine a location in a tree for a hash value of a key. More generally, any mapping function that meets the disclosed criteria, and has a limited target range may be used.

B.2 Sparse Merkle Trees

As noted earlier herein, embodiments of the invention may employ a constant 'M' which defines the number of leaves in the base of a Merkle tree. Suppose for example that the value of 'M' is 1,000,000. That means that even if the tree is empty, the Merkle tree still spans across 'M' leaves, or nodes. This would seem to imply a need to perform a large number of hash operations, even if the nodes are empty. Note that the hash operations referred to here are not the mapping function hash operations. Rather these hash operations refer to hashes, internal to the tree, of the respective data stored at the nodes of the tree and, as such, these hashes may be referred to simply as 'internal data hashes' in order to distinguish them from mapping function hash operations.

With the foregoing in view, a 'sparse' Merkle tree embraces a Merkle tree, which may, or may not, be a binary tree, in which the hash of any empty node is defined as 0 (zero). This includes nodes within the tree. For example, if all children of a node are 0, then the hash of that node is also 0. Empty nodes as such may be referred to herein as 'zero nodes.' Advantageously, the use of zero nodes may enable an efficient implementation of a sparse Merkle tree, since zero nodes may not need to be allocated. This includes zero node subtrees. Therefore, a large, but empty or nearly so, Merkle tree may not take up a significant amount of space. Note that as used herein, an 'allocated' node embraces a node that has been assigned as a location for a hash value of a key. It is noted that caution should be exercised when implementing iterators. Particularly, iterators should iterate over zero nodes and their children as usual, even if the zero nodes are not allocated.

Figure 5:
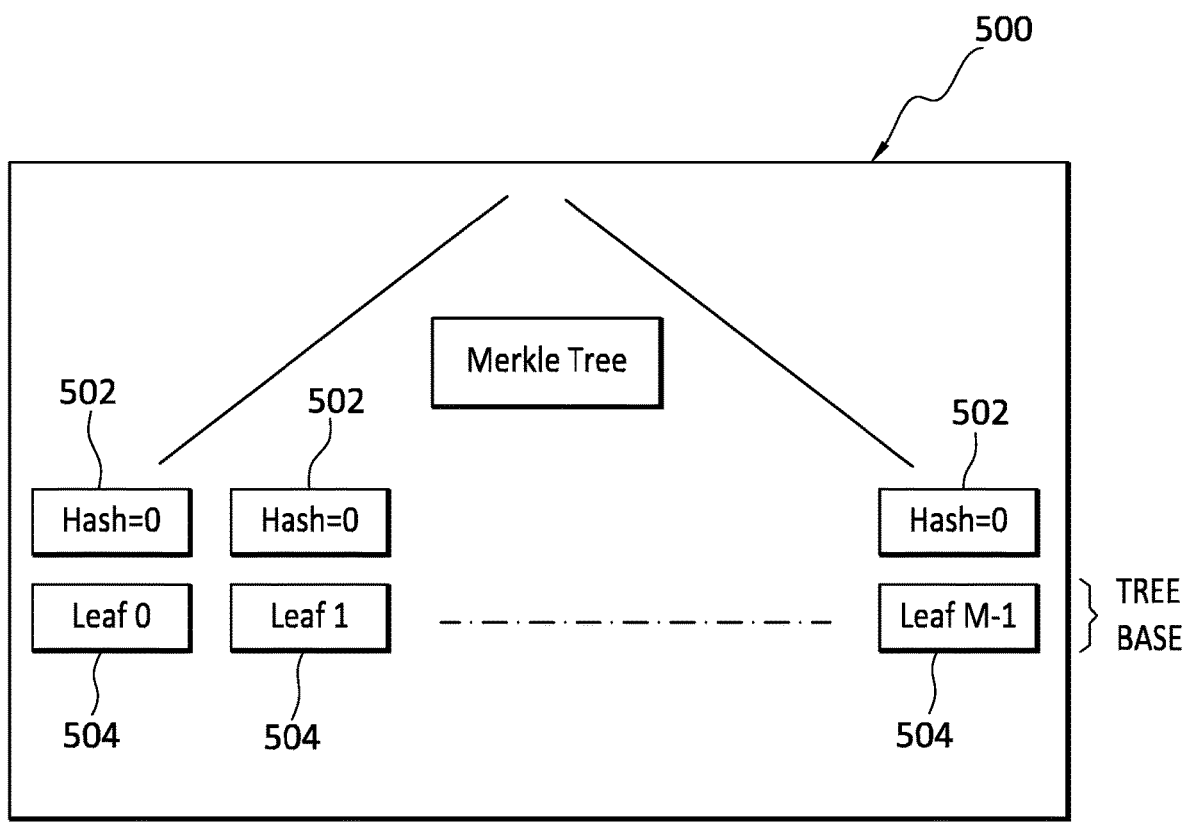
FIG. 5 discloses aspects of a tree for one or more objects.
Figure 6:
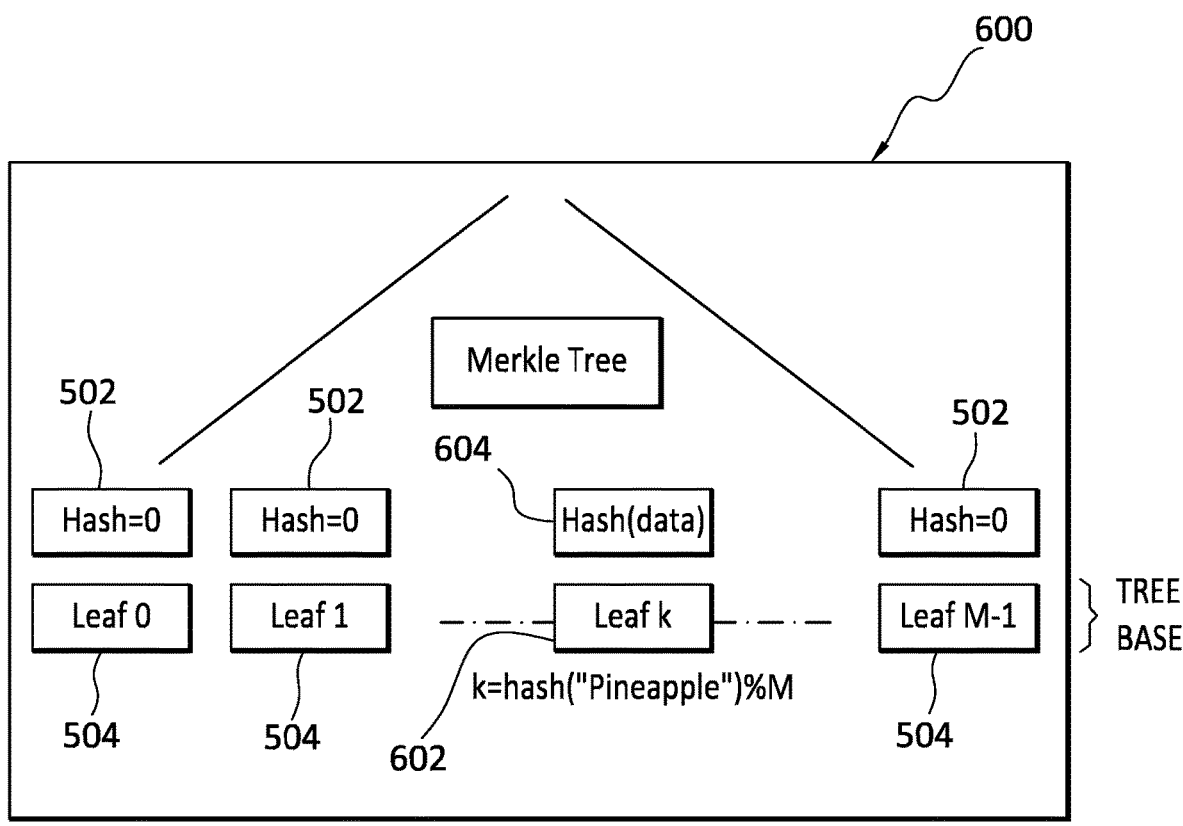
FIG. 6 discloses aspects of a tree for one or more objects in which a new leaf has been inserted into an existing tree base.

With reference now to FIGS. 5 and 6, details are provided concerning an example embodiment of the invention involving a KVP repository, such as Amazon S3 for example. FIG. 5 discloses an initial Merkle tree 500 for an empty S3 bucket, while FIG. 6 discloses the Merkle tree 500 with the addition of the object key 'Pineapple.' In general, the example of FIGS. 5 and 6 demonstrates the use of a schema, such as in an Amazon S3 data protection environment, that includes a hash function to map keys, and a sparse Merkle tree.

To deal with the dynamic number of items in S3, a maximum supportable limit of the items may be specified, that is, a maximum number 'n' of keys. The example sparse Merkle tree 500 is defined as comprising c*n leaves, where 'c' is typically a small number, such as 2, 3, or 4, for example. The number 'c' is a scaling factor that may help to ensure a large enough range, that is, number, of leaves in the tree 500 to ensure that there are no, or few, hash collisions. As such, the value of M in this example is M=c*n. Because the value of 'c' may be relatively small, operations on the sparse Merkle tree are still O(log n). With particular reference to FIG. 5, an empty Merkle tree may thus comprise, or consist of, c*n internal data hashes 502 which are 0, and each of the internal data hashes 502 may correspond to a respective leaf 504.

With continuing reference to FIG. 5, and directing attention to FIG. 6 as well, for each new element, or 'Key,' to be inserted into the tree 600, the leaf location 'Hash(Key)% M' for that element in the tree 600 may be calculated. To illustrate, for a new Key="Pineapple," the value k='hash("Pineapple")% M' will be calculated, where 'k' is a number between 0 and M-1. Particularly, 'k' will be the location, also referred to as a node or 'Leaf k' 602, for the new element in the tree 600 base. Next, the internal data hash for the element at Leaf k 602 may be calculated to generate node hash 604. At this point, the tree 600, which may be a sparse Merkle tree, has now been updated to include the new element. As shown in FIG. 6, the base of the Merkle tree 600 includes Leaf 0, Leaf 1, Leaf k, and Leaf M-1. As well, the leaves included in that base are shown arranged in a particular way, but it is noted that the illustration is provided for the sake of explanation and it is not required that there be any particular arrangement of those leaves.

As is also apparent from FIG. 6, this update has not changed the location of any of the previously existing leaves 504 of the tree 600, nor has the update affected the internal data hashes 502 respectively corresponding to the leaves 504. Thus, in this example, the new element may take log(n) hash calculations to enter in the tree 600 and entry of the new element does not change the structure of the tree.

Finally, it is noted, with respect to the base of a tree as disclosed herein, the base may have a number of leaves that is a multiple of 2, as in the case of a binary tree. However, the disclosed trees need not be binary and, as such, the base of a non-binary tree may have a number of leaves that is not a multiple of 2. As well, the base of any tree need not have a fixed number of leaves, that is, and as exemplified in FIG. 6, the number of leaves in a tree may increase and/or decrease over time as IOs are written to the dataset to which that tree corresponds. It is further noted that the number 'M' refers to the number of possible leaves that may exist in a tree base, and that the number 'M' is fixed in at least some embodiments. Although 'M' may be fixed, the number of leaves actually present in the base may vary, as just stated. More generally, it is only necessary that the source dataset tree have the same structure as the target dataset tree.

B.3 Hash Collisions

Embodiments of the invention may provide for various approaches to reduce, or eliminate, the likelihood of hash collisions such as might occur when the same location is calculated for two or more different keys. One such approach is described below.

In general, one or more embodiments of an approach for reducing hash collisions may possess the following characteristics: the order of item insertion should not matter, which is a reason for use of an ordered list such as described below; tree topology should not change, that is, no nodes are added or removed; and, there are few, or no, moves of any keys.

In one particular embodiment of an approach for reducing hash collisions, each leaf of a tree is extended to an ordered list of leaves, and the hash for that leaf will be the hash of the combination of the members of the ordered list, where those members include the leaf that was extended to the ordered list. In some embodiments, there may be only a few such lists, so the complexity of the algorithm will not be adversely affected, and the collision rate may be controlled using the constant 'c.'

Other options for resolving or reducing collisions may include rehashing, open addressing, or other chaining variants to the approach discussed above. These approaches may require adjustments to the Merkle tree hash calculation, that is the calculation k='hash("Element")% M.'

B.4 Protection of Object Storage

To protect object storage, such as an Amazon S3 bucket for example, a respective sparse Merkle tree, as disclosed herein, may be created for both the source and the replica, or target, buckets or datasets. The two trees may then be compared with each other for consistency, and then synched with each other, if necessary, as disclosed herein. It is noted that empty nodes in the source dataset may delete respective objects on the target dataset.

Finally, it is noted that in some embodiments, if the number of elements, or keys, to be added to a tree is much smaller than M, calculations may be wasted, that is, not needed to be performed, since the depth of the tree is log(c*n). One optimization that may address this situation, at least partially, is that the hashes of zero nodes may be shortcut with other hashes. For example, hash(hashvalue, 0) so that 0 nodes do not require additional rehashing. However, the order of the child nodes should be preserved and a naïve approach will mean hash(hashvalue, 0)==hash(0, hashvalue). This may be done by concatenating, for example, hashvalue_0 or 0_hashvalue, or otherwise dedicating one bit, whether in a binary tree or otherwise, to determine the child leaf number. Regardless of the methods, computational complexity may be reduced significantly by using techniques that comprise calculating hashes with zero nodes.

C. Example Methods

Figure 7:
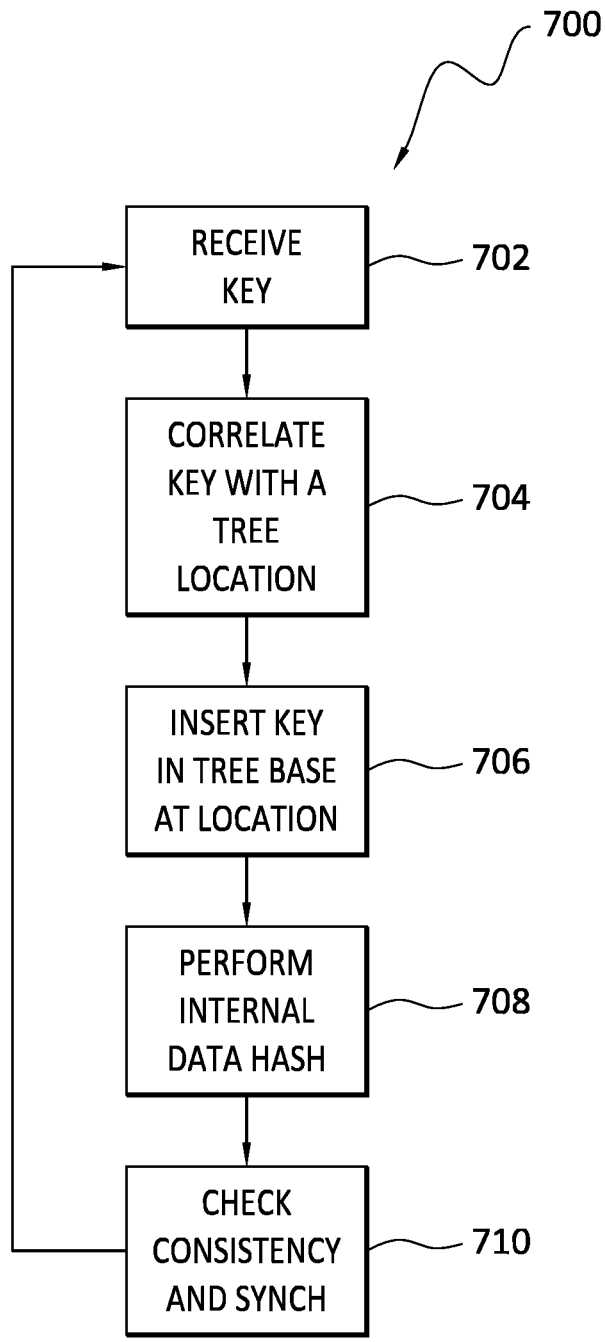
FIG. 7 discloses aspects of an example method.

With reference now to FIG. 7, details are provided concerning some methods for creating and using a tree, such as a Merkle tree, where one example method is denoted generally at 700. The method 700 may be performed by a single computing entity, or a combination of computing entities. In some instances, the method 700 may be performed, in whole or in part, by a C/S module, examples of which are disclosed herein. In some embodiments, the method 700 may be performed with binary trees, while in other embodiments, the method 700 may be performed with non-binary trees. Further, in some embodiments at least, the method 700 may be performed with sparse trees, such as sparse Merkle trees for example. As well, example embodiments, such as the method 700, may be performed in connection with a first tree that corresponds to a source dataset, and a second tree that corresponds to a target dataset. In at least some embodiments, the datasets comprise, or consist of, one or more objects, and each object may be associated with a 'key,' or name, in a KVP, where the value is the data of the object. Finally, for a given IO directed to a source dataset, a first instance of the method 700 may be performed for the tree that corresponds to the source dataset, and a second instance of the method 700 may be performed for the tree that corresponds to the target dataset.

The method 700 may begin when a key is received 702. The key may correspond with an object that has been written to a dataset as the result of an IO received from an application, for example. The key and object may together comprise a KVP.

In order to determine where the key will be inserted in a tree, the key is then correlated 704 with a corresponding location in a base of the tree. In some embodiments, the location for the key, which may also be referred to as a 'leaf location,' is based on a hash of the key. More specifically, a mapping function may be employed which involves determining the key location 'k' in the tree base using the relation: k='Map(key)'='Hash(Key)% M.' Thus, the location for the key may be determined based on a hash of that key. A key stored at key location 'k' may be referred to as 'Leaf k.'

After determination of the location for the key in the base of the tree 704, the key may then be inserted in the tree base at that location 706. The value, that is, the object, associated with the key of the KVP may then be hashed 708 and the hash stored in the tree, as shown in FIG. 6 for example.

When both the source dataset tree and the target dataset tree have each been updated to include the new key 706, and the hash of the value associated with that key 708, the two trees may then be checked for consistency, and synchronized if necessary 710. As indicated in FIG. 7, the method 700 may be performed recursively, at each of the trees, for each new key received 702.

The method 700 is not limited to addition of new keys. In some instances, the method 700 may comprise, or consist of, removal of a key from the base of a tree, as well as removal of the hash of the object to which the removed key corresponds. These processes may be performed, for example, when an IO is received that deletes or modifies an object of a source dataset. After removal of the key and the hash of the associated object from both the source dataset tree and the target dataset tree, the two trees may be checked for consistency with each other, and synchronized if necessary 710.

D. Further Example Embodiments

Following are some further example embodiments of the invention. These are presented only by way of example and are not intended to limit the scope of the invention in any way.

Embodiment 1. A method, comprising: receiving a key of a key-value pair; correlating the key to a location in a base of a Merkle tree; inserting the key at the location; hashing the value associated with the key to produce a data hash; inserting the data hash in the Merkle tree; and updating the Merkle tree, and updating the Merkle tree comprises calculating any hashes, including a root hash of the Merkle tree, affected by insertion of the data hash.

Embodiment 2. The method as recited in embodiment 1, wherein correlating the key to a location comprises hashing the key and determining the location based on a hash of the key.

Embodiment 3. The method as recited in any of embodiments 1-2, wherein insertion of the key at the location does not change a location of a key present in the base of the Merkle tree when the key was inserted.

Embodiment 4. The method as recited in any of embodiments 1-3, wherein the Merkle tree is a sparse Merkle tree.

Embodiment 5. The method as recited in any of embodiments 1-4, wherein the value of the key-value pair comprises an object.

Embodiment 6. The method as recited in any of embodiments 1-5, wherein the Merkle tree comprises a map of objects of a dataset.

Embodiment 7. The method as recited in any of embodiments 1-6, wherein the method is performed in response to an IO written to a dataset.

Embodiment 8. The method as recited in any of embodiments 1-7, wherein the Merkle tree corresponds to a dataset of unordered objects.

Embodiment 9. The method as recited in any of embodiments 1-8, wherein the Merkle tree is a non-binary tree.

Embodiment 10. The method as recited in any of embodiments 1-9, further comprising performing a consistency check of the Merkle tree, and synchronizing the Merkle tree with another Merkle tree.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
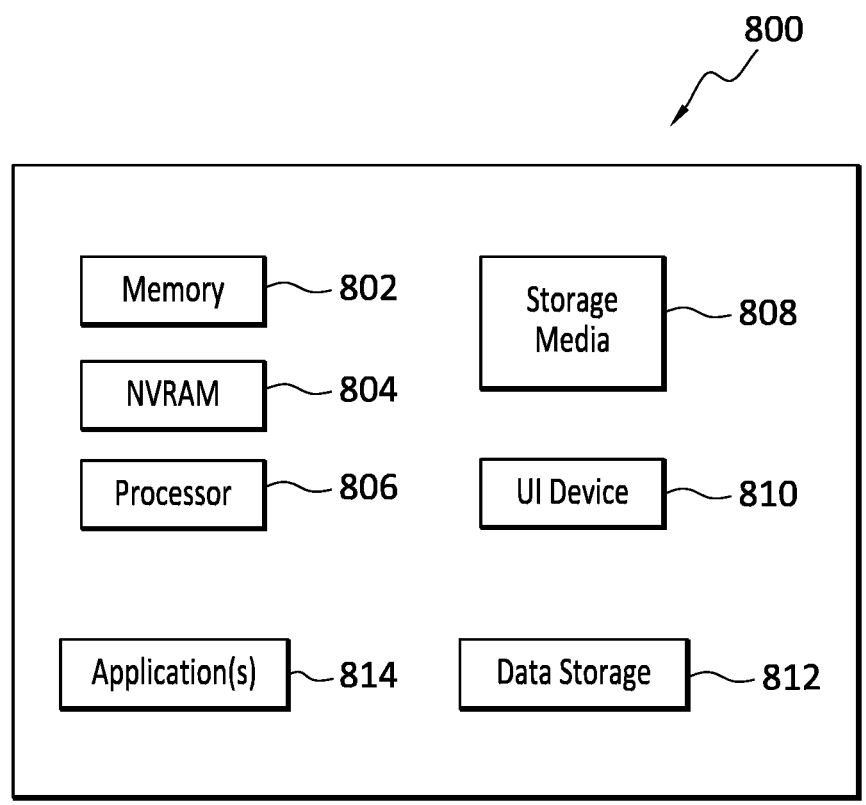
FIG. 8 discloses aspects of an example computing entity that may be employed in one or more embodiments.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile random access memory (NVRAM) 804, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a key of a key-value pair;
correlating the key to a location in a base of a Merkle tree based on a hash of the key;
after the correlating is performed, inserting the hash of the key at the location;
hashing a value associated with the key to produce a data hash;
inserting the data hash in the Merkle tree; and
updating the Merkle tree,
wherein updating the Merkle tree comprises calculating any hashes, which include a root hash of the Merkle tree, affected by insertion of the data hash, and
wherein insertion of the hash at the location does not change a location of a hash of another key present in the base of the Merkle tree when the hash was inserted.

2. The method as recited in claim 1, wherein correlating the key to a location comprises hashing the key and determining the location based on the hash of the key.

3. The method as recited in claim 1, wherein the Merkle tree is a sparse Merkle tree.

4. The method as recited in claim 1, wherein the value of the key-value pair comprises an object.

5. The method as recited in claim 1, wherein the Merkle tree comprises a map of objects of a dataset.

6. The method as recited in claim 1, wherein the method is performed in response to an IO written to a dataset.

7. The method as recited in claim 1, wherein the Merkle tree corresponds to a dataset of unordered objects.

8. The method as recited in claim 1, wherein the Merkle tree is a non-binary tree.

9. The method as recited in claim 1, further comprising performing a consistency check of the Merkle tree, and synchronizing the Merkle tree with another Merkle tree.

10. A non-transitory storage medium having stored therein instructions that are executable by one or more hardware processors to perform operations comprising:
receiving a key of a key-value pair;
correlating the key to a location in a base of a Merkle tree based on a hash of the key;
after the correlating is performed, inserting the hash of the key at the location;
hashing the value associated with the key to produce a data hash;
inserting the data hash in the Merkle tree; and
updating the Merkle tree,
wherein updating the Merkle tree comprises calculating any hashes, which includes a root hash of the Merkle tree, affected by insertion of the data hash, and
wherein insertion of the hash at the location does not change a location of a hash of another key present in the base of the Merkle tree when the hash was inserted.

11. The non-transitory storage medium as recited in claim 10, wherein correlating the key to a location comprises hashing the key and determining the location based on the hash of the key.

12. The non-transitory storage medium as recited in claim 10, wherein the Merkle tree is a sparse Merkle tree.

13. The non-transitory storage medium as recited in claim 10, wherein the value of the key-value pair comprises an object.

14. The non-transitory storage medium as recited in claim 10, wherein the Merkle tree comprises a map of objects of a dataset.

15. The non-transitory storage medium as recited in claim 10, wherein the operations are performed in response to an IO written to a dataset.

16. The non-transitory storage medium as recited in claim 10, wherein the Merkle tree corresponds to a dataset of unordered objects.

17. The non-transitory storage medium as recited in claim 10, wherein the Merkle tree is a non-binary tree.

18. The non-transitory storage medium as recited in claim 10, wherein the operations further comprise performing a consistency check of the Merkle tree, and synchronizing the Merkle tree with another Merkle tree.

* * * * *